Jan. 13, 1959
T. HINDMARCH
2,868,037
TORSIONALLY RESILIENT MOUNTING
Filed Sept. 23, 1954
2 Sheets-Sheet 1
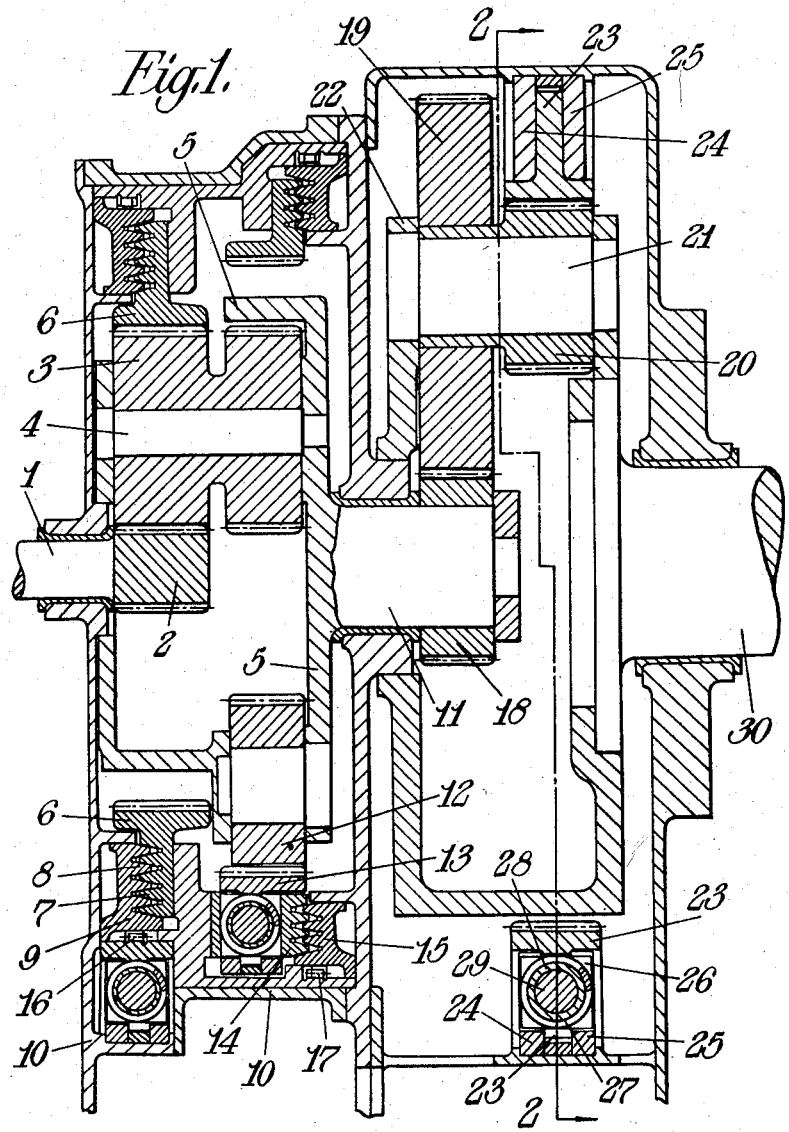
Inventor
T. Hindmarch Jan. 13, 1959     T. HINDMARCH     2,868,037
TORSIONALLY RESILIENT MOUNTING
Filed Sept. 23, 1954     2 Sheets-Sheet 2
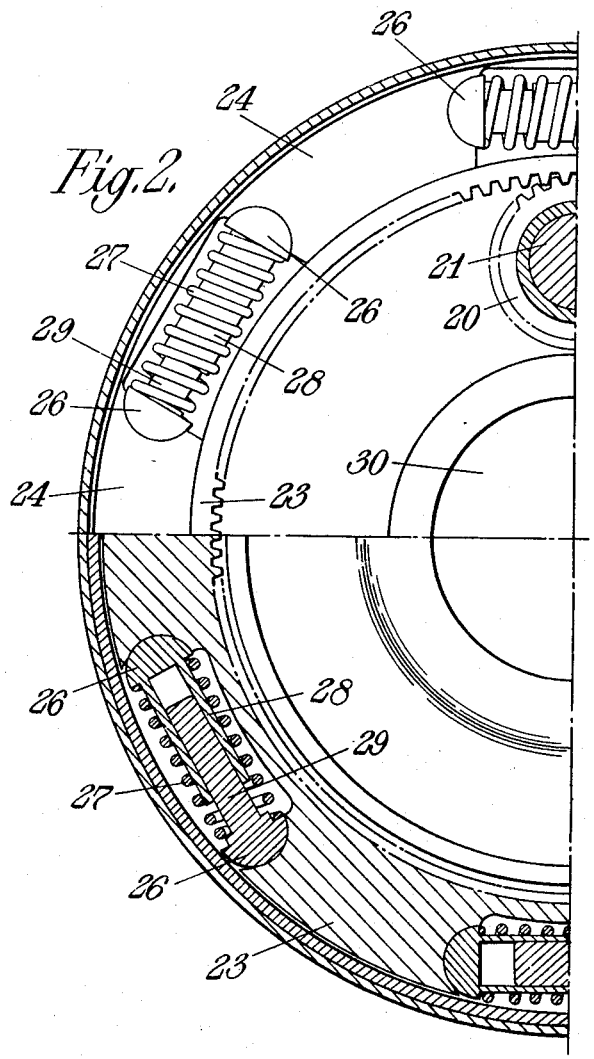
Inventor
T. Hindmarch

United States Patent Office 2,868,037
Patented Jan. 13, 1959

2,868,037

TORSIONALLY RESILIENT MOUNTING

Thomas Hindmarch, Chesham, England

Application September 23, 1954, Serial No. 457,898

Claims priority, application Great Britain
January 1, 1954

4 Claims. (Cl. 74—785)

This invention relates to a manner of providing a torsionally resilient mounting within an epicyclic gear box.

Because of their internal complications epicyclic gears in general are less able to withstand shocks and stresses due to torsional oscillations than are the more conventional forms of gears. A resilient coupling may be inserted between the prime mover and the gear and/or between the gear and the driven shaft, but modern high speed designs require a greater measure of internal protection against shocks and torsional oscillations.

The object of the present invention is to provide a resilient mounting for use within epicyclic gears which is of integral construction and provides protection to the gear teeth.

The invention consists in a resilient mounting comprising two elements each constituted by one or more annular rings and resilient means between the rings for transmitting torque between the elements resiliently.

The invention further consists in a device as set forth in the preceding paragraph in which one of the elements is constituted by an annular ring of inverted T-cross section while the other element is constituted by a pair of flat plate-like annular rings situated one each side of the upright of the T, the two elements being provided with registering slots therein adapted each to contain a pair of abutment members and one or more helical springs.

The invention still further consists in an epicyclic gear having at least one mounting as set forth in the preceding paragraph in which one of the elements is attached to or formed as part of the casing of the gear while the other element is attached to, formed as part of, or adapted to engage a reaction part of the gear which is thereby permitted limited rotational travel.

It is characteristic of many forms of epicyclic gears that brakes are provided for controlling one or more of the three essential elements of the gear viz. the sun gear, the planet carrier or the annulus gear. It is proposed in one mode of carrying the present invention into effect to provide a resilient mounting either between a brake and the frame or casing of the gear or between a brake and one or other of the three essential elements of the gear above referred to depending on the circumstances. Such an arrangement does not merely comprise fitting a resilient coupling inside the gear casing instead of outside, but forming the torsionally resilient mounting integral with the epicyclic construction.

The resilient mounting constructed in accordance with the invention is particularly adaptable for use with the fluid pressure operated friction brake described in my British Patent No. 772,840 and in co-pending corresponding United States application, Serial No. 456,488, filed September 16, 1954, in which the brake is of the kind having engageable friction members as therein described. Since the clutch or brake of the above referred to British Patent and United States application and the resilient coupling in accordance with the present invention are both in the form of annular rings, they may be positioned side by side or one within the other.

In those forms of epicyclic construction which have no permanently fixed reaction members, that is where all the reaction members are controlled by brakes, I can anchor the brakes as described in my British Patent No. 772,840 and United States application, Serial No. 456,488 to the outer casing via the torsional resilient mounting, the subject of this invention.

Where in the case of two-stage epicyclic gears there is what might be called a spare annulus or reaction member which otherwise would be rigidly fastened to the casing, a resilient member may be inserted to allow of restricted rotational movement of the reaction member against the resilient members in the mounting. In one form of construction of the two-stage epicyclic gear, the first stage has two annuli in the form of brakes constructed in accordance with British Patent No. 772,840 and United States application, Serial No. 456,488, one for forward direction of rotation and one for reverse. The appropriate direction of rotation is provided by applying the appropriate brake. The output shaft of the second stage is connected to a carrier in which are mounted compound planets, the larger pinions of which mesh with a sun gear on the output shaft of the first stage and the smaller pinions with the annulus which is anchored to the casing through a torsionally resilient coupling, the subject of this invention.

The resilient coupling comprises an inner toothed ring of T-cross section the teeth being on the cross of the T while the outer member comprises a pair of flat rings one on each side of the upright of the T, while a number of slots are formed through the T and the plates which register with one another and which have semi-circular ends for engagement by semi-circular abutment members between which the resilient members or springs are situated. The abutment members may be provided the one with a cylindrical shaped hollow tube while the other is provided with a plunger which works in the tube and coaxial with the spring and thus keeps them in alignment. The cylinder and plunger may be formed as hydraulic damping means.

The resilient units are preferably mounted centrally in the width of the annular rings of the coupling while the number and stiffness of the units may be varied according to the torsional characteristic required.

There are a number of alternative positions in which the resilient coupling may be mounted, earlier or later in the transmission or both according to the service in which the individual transmission gear is employed.

When used in conjunction with a brake as described in my copending United States application Serial No. 456,488 and British Patent 772,840 corresponding thereto, I accomplish this without substantial alteration to the overall dimensions of the transmission gear.

As I have indicated, my resilient mounting is applicable to practically all forms of epicyclic gear whether single stage or double stage. It is likewise applicable to the most simple case, namely, a plain epicyclic reduction gear without a brake and one which is operated under constant engagement. In this case, the resilient mounting acting upon reaction member be it the annulus, the carrier or the sun pinion, can operate to suppress or diminish vibrations carried into the transmission gear.

The accompanying drawing shows, by way of example only, one embodiment of the invention, in which:

Figure 1 is an axial section of the epicyclic gear; while

Figure 2 is a transverse section on the line 2—2 of Figure 1.

The first stage of the gear comprises an input shaft 1 having thereon a sun wheel 2 which engages the planet wheel 3 rotatable on the pin 4 supported on planet carrier 5. The planet wheel 3 engages the teeth on the inner periphery of the reaction annular ring 6 which is provided with V-shaped annular grooves 7 engageable with corresponding grooves 8 on the outer annular ring member 9 which is resiliently mounted upon the casing 10 of the gear. Upon engaging this brake the reaction ring 6 is resiliently held stationary and the planet carrier rotates in one direction thus rotating the shaft 11.

The planet carrier is also provided with the planet wheels 12 which engage the reaction annular ring 13 resiliently connected to one side 14 of the brake, the other side 15 of which is attached to the casing 10. Axial movement of the movable members 9 and 15 is permitted to engage the brakes, but circumferential movement is prevented by the splines 16 and 17. When the latter brake is engaged instead of the first mentioned brake the shaft 11 rotates in the other direction. There are therefore provided two annuli in the first stage of the gear to obtain forward and reverse direction of drives by engaging the resiliently mounted brakes alternatively. The shaft 11 carries the sun pinion 18 which engages the planet wheels 19 mounted for rotation with the pinion 20 freely on the pin 21 fixed to the carrier 22 to form a compound type of planetary system. The teeth on the pinion 20 engage the teeth on the reaction annular ring 23 which is T-shaped in cross section and is sandwiched between the outer ring members 24 and 25. The member 23 is allowed limited resilient rotational movement in respect of the members 24 and 25 which are rigidly attached to the casing.

On referring to Figure 2 it may be seen that the annular ring members 23, 24 and 25 are provided with semi-circular ended slots which register one with another and into which engage the semi-circular abutment members 26 between which the springs 27 are situated. The abutment members 26 are provided the one in each pair with a cylindrically shaped hollow tube 28 while the other is provided with a plunger 29 which works in the tube 28 and coaxial with the spring, and thus keeps them in alignment. The cylinder and plunger may be formed as hydraulic damping means. When the central member 23 moves relative to the outer members 24 and 25 in either direction the common slots are shortened and the springs compressed.

The drive from the planet carrier 22 is taken by way of the output shaft 30.

The number and stiffness of the resilient units may be varied according to the characteristics of the torque transmitted.

It is to be understood that the forms of embodiment described are by way of example only and that details for carrying the invention into effect may be varied without departing from the scope of the invention.

I claim:

1. An epicyclic transmission comprising a casing, a gear assembly within the casing and including a sun gear, a planet carrier and a planet gear on the carrier meshing with the sun gear, an annular member having teeth meshing with the planet gear, a second annular member carried by the casing and movable axially into engagement with the first annular member to constitute a braking means, and a series of tangential springs associated with said annular members allowing limited rotational movement between said members and the casing to compensate for varying torques transmitted through the gear assembly.

2. An epicyclic transmission as defined in claim 1, wherein the engagement between said annular members is effected by complemental V-shaped annular grooves on said members defining a friction brake.

3. An epicyclic transmission comprising a casing, a gear assembly within the casing and including a sun gear, a planet carrier and a planet gear on the carrier meshing with the sun gear, an annular member within the casing having teeth meshing with the planet gear, braking means for the annular member, and a series of tangential springs operatively connected with the annular member and the casing allowing limited rotational movement between the annular member and the casing to compensate for varying torques transmitted through the gear assembly.

4. An epicyclic transmission comprising a casing, a gear assembly within the casing and including a sun gear, a planet carrier and a planet gear in operative engagement with the sun gear, an annular member provided with teeth meshing with the planet gear, brake means for the annular member mounted on the casing, and a series of tangential springs operatively connecting the annular member to the brake means to allow a limited rotational movement between the annular member and the casing to compensate for varying torques transmitted through the gear assembly.

References Cited in the file of this patent

UNITED STATES PATENTS

| 1,192,731 | Batchelder | July 25, 1916 |
| 1,952,324 | Ljungstrom | Mar. 27, 1934 |
| 2,316,820 | Thelander | Apr. 20, 1943 |
| 2,321,941 | Rose | June 15, 1943 |
| 2,682,789 | Ochtman | July 6, 1954 |
| 2,764,260 | Fleischman | Sept. 25, 1956 |

FOREIGN PATENTS

| 281,237 | Great Britain | May 10, 1928 |
| 733,590 | Great Britain | July 13, 1955 |